United States Patent [19]

Fogg et al.

[11] Patent Number: 5,337,236

[45] Date of Patent: Aug. 9, 1994

[54] SYSTEM FOR CATEGORIZING AND RECORDING VEHICLE TRIP DISTANCE

[75] Inventors: Raymond C. Fogg, Hillsboro; James J. Lushina, Aloha, both of Oreg.

[73] Assignee: Taurean Electronics, Inc., Hillsboro, Oreg.

[21] Appl. No.: 525,845

[22] Filed: May 21, 1990

[51] Int. Cl.$^5$ .............................................. G06F 15/21
[52] U.S. Cl. .................... 364/424.04; 364/406
[58] Field of Search ............... 364/424.04, 550, 561; 346/33 R, 33 M; 235/97; 377/24.1; 340/459

[56] References Cited

U.S. PATENT DOCUMENTS

| | | | |
|---|---|---|---|
| 4,192,006 | 3/1980 | Hausdorff | 364/715 |
| 4,677,429 | 6/1987 | Glotzbach | 340/711 |
| 4,755,832 | 7/1988 | Gulas et al. | 346/33 R |
| 4,852,000 | 7/1989 | Webb et al. | 364/406 |
| 4,866,616 | 9/1989 | Takeuchi et al. | 340/459 |
| 4,875,167 | 10/1989 | Price et al. | 346/33 R |

*Primary Examiner*—Thomas G. Black
*Attorney, Agent, or Firm*—Dellett and Walters

[57] ABSTRACT

A trip distance recorder for a motor vehicle includes a character display and several front panel keys. The recorder stores an operator-definable "trip type" code associated with each key. At the start of a trip, an operator presses one of the keys to select one of the stored codes. The recorder then displays the selected trip type code and elapsed distance for the trip. At the end of the trip, the recorder stores the trip code, distance and date as an entry in a data base maintained in non-volatile memory. The recorder generates printed trip reports based on the information contained in the data base.

8 Claims, 7 Drawing Sheets

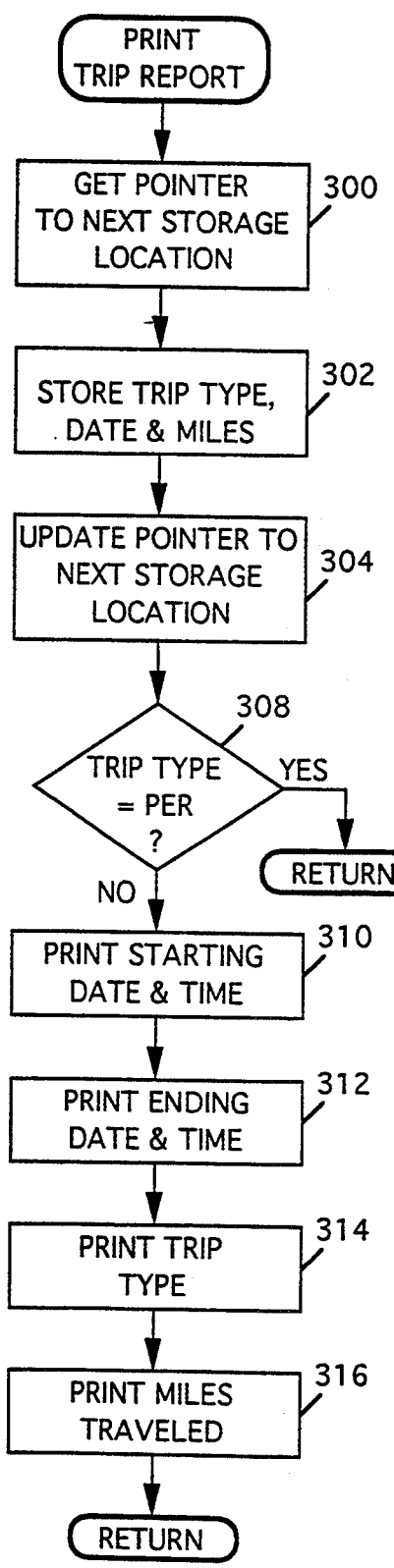
FIG. 6
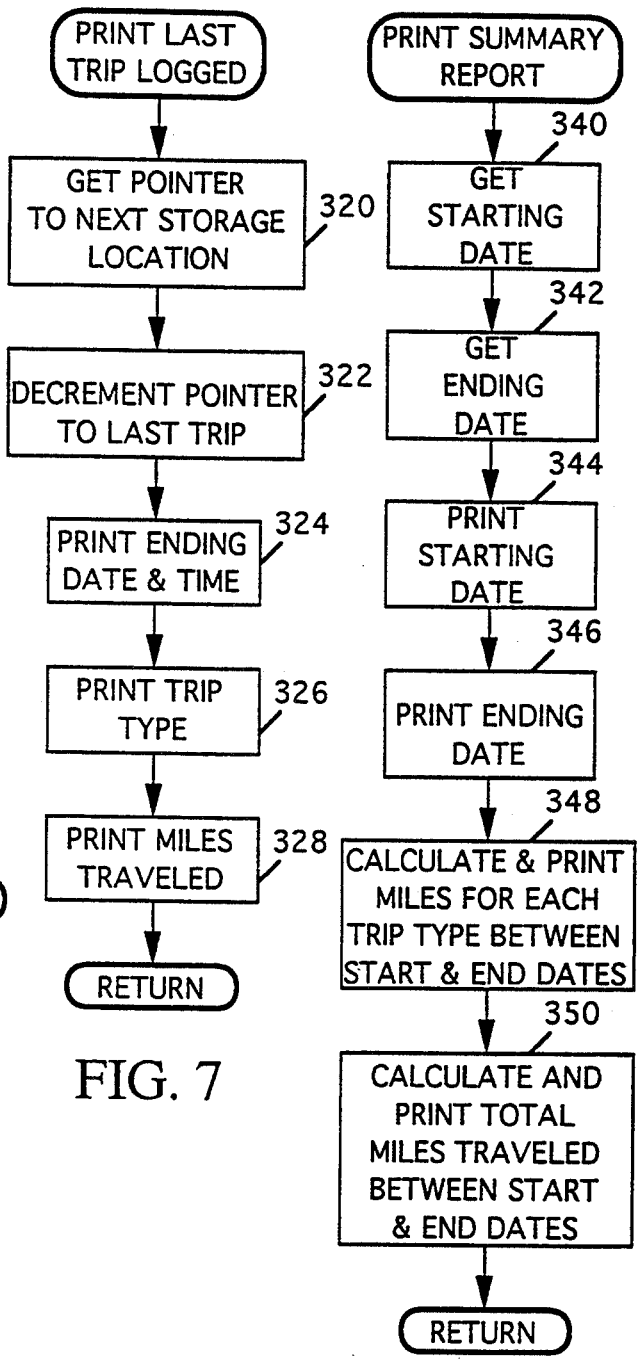
FIG. 7
FIG. 8

SYSTEM FOR CATEGORIZING AND RECORDING VEHICLE TRIP DISTANCE

BACKGROUND OF THE INVENTION

The present invention relates in general to a system for recording vehicle trip distance and in particular to a system that records trip distance under operator-defined categories.

Motor vehicles operators often manually record the date, purpose and distance of each trip taken. Trips taken for business purposes are often charged to clients or expensed for income tax purposes at a set rate per mile. However, an operator may forget to record a trip and may make errors in recording odometer readings or computing distance driven.

A vehicle distance recorder monitors vehicle movement and provides a printed record of distance traveled. U.S. Pat. No. 4,755,832 issued Jul. 5, 1988 to Gulas et al illustrates a prior art distance recorder that permits an operator to designate whether each trip is for personal or business purposes. At the start of a trip an operator presses either a front panel pushbutton marked "P" (personal) or a pushbutton marked "B" (business). The Gulas et al recorder thereafter monitors rotation of a vehicle's speedometer cable to determine the distance the vehicle moves. On completion of the trip, the recorder prints out a record of the distance traveled together with an indication of whether the operator designated the trip as business or personal. The recorder also stores in memory a record of all trips taken during a period of operator-selected duration and may on command of the operator print out a record of all such trips or a summary of miles driven during such period under each of the two allowable categories.

While the Gulas et al recorder is particularly useful for operators needing only to keep track of trips under the two predetermined categories (business and personal), the record provided by the recorder is less satisfactory for an operator wishing to more precisely identify the purpose of each trip. For example, when an operator wishes to charge various business trips to separate clients, the operator would not be able to determine from the printed record which "business" trip should be charged to each client.

SUMMARY OF THE INVENTION

In accordance with one aspect of the present invention a vehicle trip distance recorder includes a light emitting diode character display and twelve numbered front panel keys. The recorder stores in memory a three-character "trip type" code associated with each of ten of these keys. Each trip type code may, for example, represent a different trip category or account to which a trip may be charged. At the start of a trip, an operator presses one of the ten keys to select one of the stored trip type codes. The recorder thereafter reads and displays the selected trip type code and also monitors and displays the elapsed mileage for the trip in progress. At the completion of the trip, the recorder enters the selected code into a data base record also maintained in memory along with data indicating trip distance.

In accordance with another aspect of the invention, the recorder permits the operator to selectively alter the trip type code associated with each key.

In accordance with a further aspect of the invention, the recorder includes a printer and prints out the date, distance and trip type code at the conclusion of each trip.

In accordance with a still further aspect of the invention, the recorder stores the date of each trip in the data base record containing the distance and trip type code for the trip. On command of the operator, the recorder prints out a summary of distance traveled for each trip type between any two operator-selected dates.

In accordance with yet another aspect of the invention, the memory storing the trip database comprises a non-volatile, electronically erasable programmable read only memory. Thus, the data base is retained even when the recorder power supply is interrupted.

In accordance with still another aspect of the invention, the recorder counts cycles of a sensor output signal of frequency proportional to vehicle speed to determine distance traveled. An operator may assist the recorder to calibrate a constant of proportionality between the cycle count and distance traveled by entering into the recorder vehicle odometer readings taken at the beginning and end of a trip. After the operator enters the beginning odometer reading, the recorder displays a countdown number that is decremented as the vehicle moves. The countdown number is inversely proportional to a sensor signal cycle count maintained during the trip. The countdown number reaches 0 before the cycle count overruns a maximum limit. If the operator enters the ending odometer reading before the countdown reaches 0, the calibration procedure will be successful since the cycle count will be within its acceptable limit. Thus, the displayed countdown indicates when the operator may appropriately enter the ending odometer reading.

It is accordingly an object of the invention to provide an improved vehicle distance recorder that permits a user to select a user-definable trip type code for each trip and displays that code when selected.

It is another object of the invention to provide a summary of distance traveled for each trip type between any two operator-selected dates.

It is a further object of the invention to provide a vehicle distance recorder that stores a record of trips taken in non-volatile memory.

It is a still further object of the invention to provide a vehicle distance recorder that may be easily and accurately calibrated.

The concluding portion of this specification particularly points out and distinctly claims the subject matter of the present invention. However, those skilled in the art will best understand both the organization and method of operation of the invention, together with further advantages and objects thereof, by reading the following description in view of the accompanying drawings wherein like reference characters refer to like elements.

BRIEF DESCRIPTION OF THE DRAWINGS

FIGS. 3–10 are flow charts illustrating software executed by the computer of FIG. 2.

DESCRIPTION OF THE PREFERRED EMBODIMENT

Figure 1:
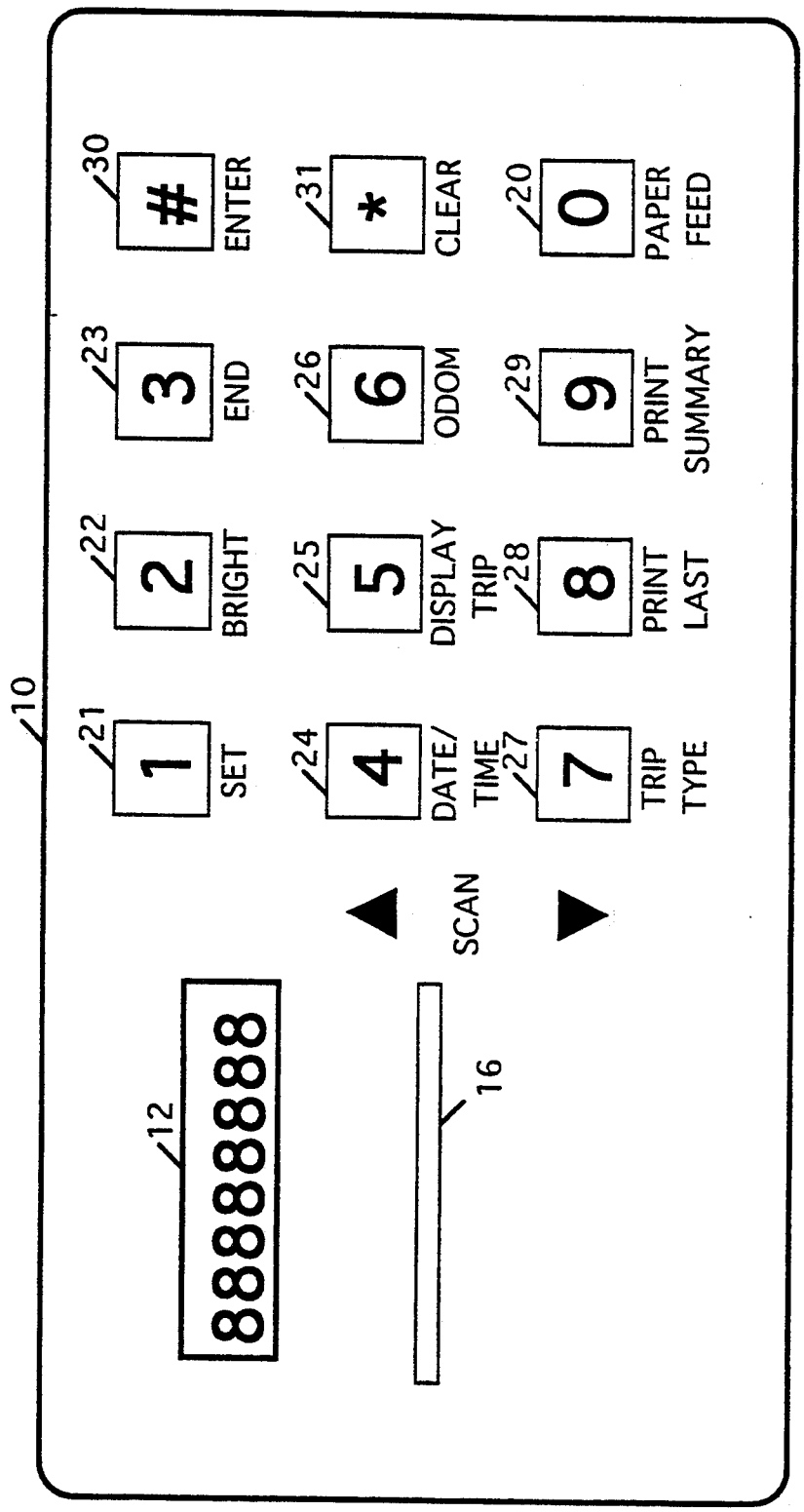
FIG. 1 illustrates a front panel of a programmable distance recorder in accordance an embodiment of the present invention.

FIG. 1 illustrates a front panel 10 of a programmable distance recorder for a vehicle in accordance with the invention. Mounted on front panel 10 are an eight character electronic display 12 and a set of twelve data entry keys 20-31. A strip paper output of a printer within the distance recorder passes out of a slot 16 in panel 10.

The distance recorder monitors the distance the vehicle travels for each trip. At the start of a trip, the operator may select a three character "trip type" code for the trip, such as, for example, "PER", "BUS", or "MED". The code for each trip type other than PER is operator-definable and identifies the trip as being one of up to ten different "trip type" categories. At the end of each trip, the distance recorder stores and prints out records of the trip including distance driven and the trip type code. On command of the operator, the distance recorder can also print out a summary of all trips taken between any two dates for each trip type category. The operator may also command the distance recorder to display date, time, current trip type code and elapsed trip distance, or current odometer reading.

Figure 2:
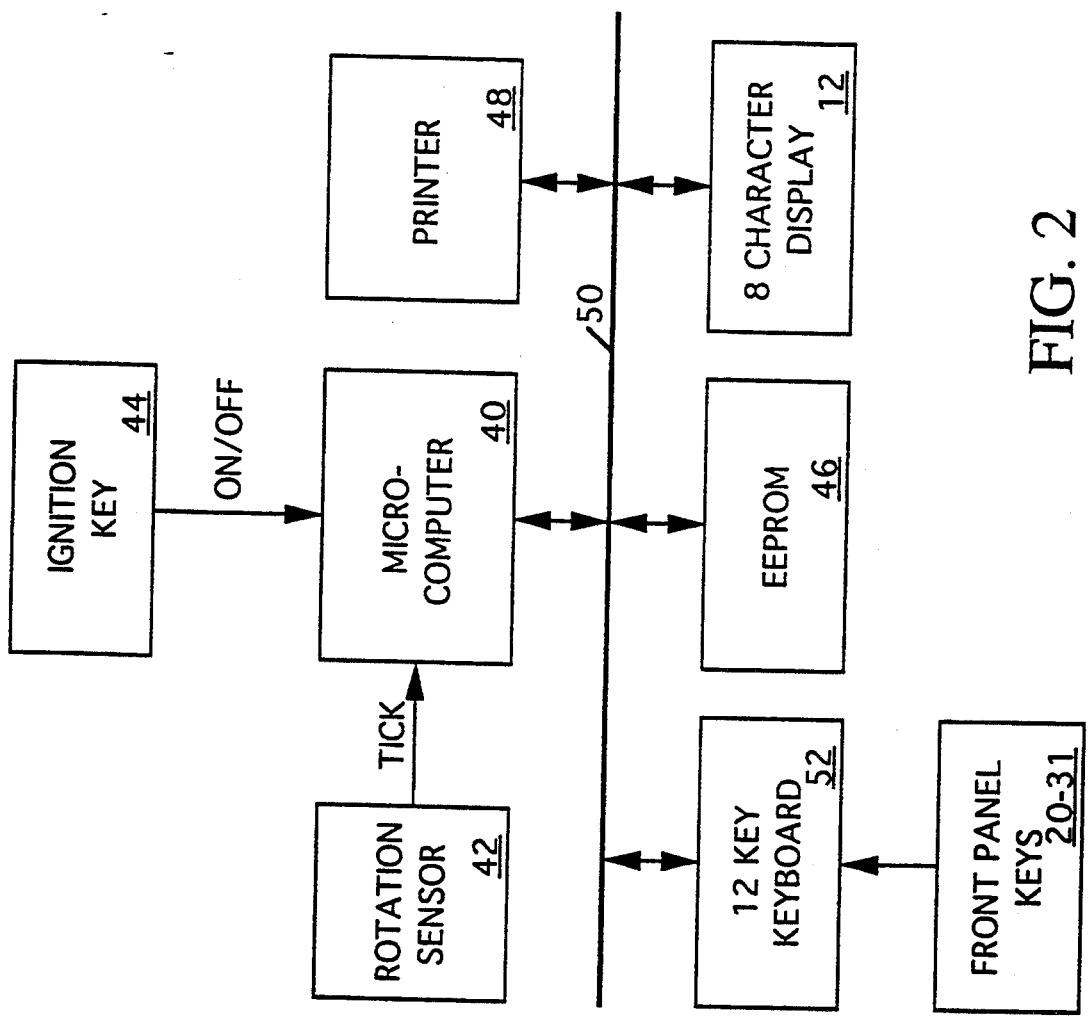
FIG. 2 is a block diagram of a distance recorder in accordance with an embodiment of the present invention.

FIG. 2 illustrates the distance recorder in electronic block diagram form. The distance recorder contains a microcomputer 40, suitably an Intel model 8051 configured with read only and random access memory for program and data storage. The distance recorder also includes a drive shaft rotation sensor 42 supplying a pulsed "TICK" input signal to an interrupt input of computer 40. Sensor 42 suitably comprises one or more magnets attached to the vehicle drive shaft and a Hall-effect device attached to the vehicle chassis near the drive shaft such that the magnets pass induce pulses in the Hall-effect device as the drive shaft rotates. The Hall-effect device transmits the result to computer 40 as the "TICK" input signal. Such rotation sensors are well-known to those skilled in the art and are not further detailed herein.

Also included in the distance recorder are a printer 48 for producing printed trip and summary records, a non-volatile, electronically erasable, programmable read only memory (EEPROM) 46 for storing trip records and other data and a twelve key keyboard interface 52 for buffering signals from data input keys 20-31. Keyboard interface 52, EEPROM 46, display 12 and printer 48 are all coupled to microcomputer 40 via a computer bus 50. An ignition key switch 44 of the vehicle provides an "ON/OFF" signal input to an external interrupt of computer 40 to indicate when the vehicle is in use.

Referring to FIGS. 1 and 2, the operator inputs commands and information through data entry keys 20-31. Keys 20-29 are marked with digits 0 through 9 respectively, while keys 30 and 31 are marked with the characters "#" and "*" respectively. An additional command label such as "SET", "BRIGHT" or "END", etc. appears below each key 30-31.

Each key 20-29 on front panel 12 is associated with a separate one of the ten trip types. As discussed hereinbelow, the operator can assign any three-character code to any of the ten trip types. The trip types associated with keys 25-29 have no default codes, but default trip type codes for keys 20-24 are assigned as follows:

TABLE I

| TRIP TYPE | KEY | CODE |
|---|---|---|
| Personal | 20 | PER |
| Business | 21 | BUS |
| Volunteer | 22 | VOL |
| Medical | 23 | MED |
| Education | 24 | EDU |

To signal the start of a trip, the operator presses the TRIP TYPE key 27. The distance recorder responds by reading out "SELECT" on display 12 to prompt the operator to select one of the ten possible trip trips. The operator then presses one of the keys 20-29 to indicate which trip type. Assume the trip type associated with key 21 is currently associated with the business account and is identified by the default code "BUS". When the operator presses key 21, the distance recorder responds by displaying "BUS000.0". This display indicates that the distance for the trip in progress is to be recorded under the business (BUS) code and that the total distance for the trip is currently 000.0. When the operator is satisfied he has selected the proper trip type code, he presses the ENTER key 30. The distance recorder then stores a starting time, date and an odometer reading. Thereafter, as the vehicle moves, the distance recorder increments its a stored odometer parameter value every time the vehicle moves an additional 0.1 miles and updates the distance displayed accordingly. For example, after 159 miles the display would read "BUS159.0".

To signal the end of a trip, the operator may signal the beginning of another by pressing the TRIP TYPE key 27 followed by the appropriate key 20-29 and the ENTER key 30. The distance recorder stores in an internal data base the current date and the elapsed distance and trip type code for the completed trip. If the trip type code was other than "PER", the distance recorder temporarily displays "PRINTING" while it prints a trip report in the following format:

TABLE II

| START |
|---|
| 07-15-91 |
| 07:48 AM |
| 31486.5 |
| END |
| 07-15-91 |
| 03:18 PM |
| 1BUS . . . 321.1 |

This report indicates that the trip started at 7:48 AM on Jul. 15, 1991 and ended at 3:18 PM on the same day. The starting odometer reading was 31486, the ending odometer reading was 31807, the total elapsed distance for the trip was 321 and the trip was type BUS selected by the key labeled "1". After the recorder finishes printing the report for the completed trip, it restores the display to the "trip" mode where it indicates the trip type code and elapsed distance for the next trip, now in progress.

If the operator does not wish to terminate a trip by selecting a new trip code, the operator may also signal the end of a trip by pressing the END key 23 followed by the ENTER key 30. In this case, the recorder stores and prints the data for the completed trip in the manner described hereinabove but automatically assigns a PER (personal) code for the next trip.

The distance recorder also prints a record of the last trip (i.e., the trip made before the current trip in progress) when the operator presses the PRINT LAST key. The last trip record indicates the ending date of the trip, the trip type code, and the miles traveled.

The distance recorder may additionally print a summary of trips made between any two dates. The operator first depresses the PRINT SUMMARY key 29, and the distance recorder responds by displaying a "FROMDATE" prompt. The operator thereupon uses the numbered keys to enter a starting date in an MMDDYY format (two digit month, two digit day and two digit year) and then presses the ENTER key. The distance recorder next displays a "THRUDATE" prompt to which the operator responds by entering a six digit ending date and then depressing the ENTER key. The distance recorder then displays "PRINTING" and prints a summary report in the following format:

TABLE III

| SUMMARY REPORT | |
|---|---|
| FROM 01-01-89 | |
| THRU 01-31-89 | |
| 9ABX... | 0 |
| 8ABD... | 0 |
| 7ABC... | 0 |
| 6ABB... | 0 |
| 5ABA... | 0 |
| 4EDO... | 36 |
| 3MEB... | 0 |
| 2VOL... | 411 |
| 1BUS... | 1,258 |
| TOTAL... | 1,705 |

The operator may change the code associated with any of the ten trip types. To do so, the operator first presses the SET key 21. The distance recorder responds by displaying the prompt "SET?". The operator then presses the TRIP TYPE key 27. The distance recorder thereafter displays the prompt "KEY#?". The operator responds to this prompt by pressing a selected one of keys 21–29. For example, when the operator presses key 21, the distance recorder responds with the prompt 1???. This tells the operator that the recorder is ready to accept a new three-character code for the key labeled "1". Initially, the first question mark in the display blinks. When the operator depresses a key 24 or 27, the distance recorder displays a blinking "A" or a "Z" in place of the blinking "?". As the operator continues to depress the key 24 or 27, the distance recorder scrolls the displayed blinking character forward or backward through the alphabet. When the operator has appropriately adjusted the blinking character, the operator presses the ENTER button 30. The second "?" in the display then begins to blink. The operator then depresses keys 24 or 27 to appropriately adjust the second character of the trip type code. After the operator again depresses the ENTER key, the third "?" begins to blink, and the operator thereupon selects the third character of the trip type code in a similar manner. After the operator again presses the ENTER key, the distance recorder displays the selected trip type code and stores it in memory so that thereafter, i t associates the new code with the selected key whenever the operator uses the key to designate trip type.

The operator may command the distance recorder to display the current date by pressing the DATE/TIME key 24. When the operator presses the DATE/TIME key twice, the distance recorder displays the current time. The operator can also command the distance recorder to display the current odometer reading by pressing the ODOM key 26 without first pressing the SET key 21. The operator can command the recorder to display the current trip distance display by pressing the DISPLAY TRIP key 25. Key 22, labeled "BRIGHT" controls the brightness of display 12. As the operator repeatedly presses the BRIGHT key, the display grows dimmer. When the operator presses the BRIGHT key after display brightness reaches a minimum, display brightness reverts to its highest level.

The operator may also adjust an internal clock and calendar within the distance recorder that keeps track of date and time. When the operator presses the SET button, the distance recorder shows SET? on display 12. When the operator thereafter presses the DATE/TIME key, the distance recorder shows "00-00-00" on display 12. Using keys 20–29, the operator then enters a digit sequence such as 060491 indicating a date such as Jun. 4, 1991 (06-04-91). The operator then presses ENTER key 30 to set the system calendar to that date. When the distance recorder next shows 00:00 AM on display 12, the operator enters a digit sequence such as 0335 to change the time display to, for example, 03:35 AM. When the operator then presses the ENTER key. 30, the distance recorder displays an "AM/PM?" prompt. When the operator presses any key other then ENTER, the distance recorder re-displays the operator selected time. However, the recorder toggles the display between "AM" and "PM" each time the operator presses a key other than ENTER. When the operator thereafter presses the ENTER key, the distance recorder resets its internal clock to the last displayed time.

As described in detail hereinbelow, a microcomputer interrupt routine counts TICK signal pulses to determine when to increment an odometer parameter (ODOM) stored in EEPROM 46. The ODOM parameter indicates total miles traveled by the vehicle. A stored TICKS/TENTH parameter indicates the number of TICK signal pulses the recorder is to count before incrementing the odometer parameter value by 0.1 mile. After the recorder is installed in a vehicle, the operator may help the distance recorder calibrate the TICKS/TENTH parameter value so that the recorder correctly increments the ODOM parameter as the TICK count progresses. To do so, the operator first presses the SET key 21 and the ODOM key 26 in sequence. The distance recorder responds by displaying "000000.0". The operator next keys in a sequence of digits indicating a current (starting) odometer reading of the vehicle, such as "8349.7" and then presses the ENTER key. At that point the distance recorder places "CAL 250" on display 12. As the operator thereafter drives the vehicle, the distance recorder counts TICK signal pulses. The distance recorder also progressively decrements the number on the display. Before the displayed number falls to 0, and when the operator has driven the vehicle suitably at least five miles, the operator depresses the set key 21 and the ODOM key 26 and then uses keys 20–29 to enter the current (ending) vehicle odometer reading. The microcomputer thereupon updates the ODOM parameter value to reflect the ending vehicle odometer reading. The microcomputer also calculates a new TICK/TENTH parameter value by dividing the TICK signal pulse count by the difference between the ending and beginning odometer readings keyed in by the operator. The distance recorder stores the TICKS/TENTH value in EEPROM 46 and then uses it to determine how many TICK pulses it must count before incrementing its internal ODOM parameter value.

The countdown number displayed during the calibration process is inversely proportional to a sensor signal cycle count maintained during the trip. The countdown number reaches 0 before the cycle count overruns a maximum limit. If the operator enters the ending odometer reading before the countdown reaches 0, the calibration procedure will be successful, since the cycle count will be within its acceptable limit. Thus, the displayed countdown indicates when the operator may appropriately enter the ending odometer reading.

The operator may clear the display at any time by pressing the CLEAR key 31. This key is particularly useful when the operator wishes to "erase" a mistake made during any of the above-described data entry operations.

Figure 3:
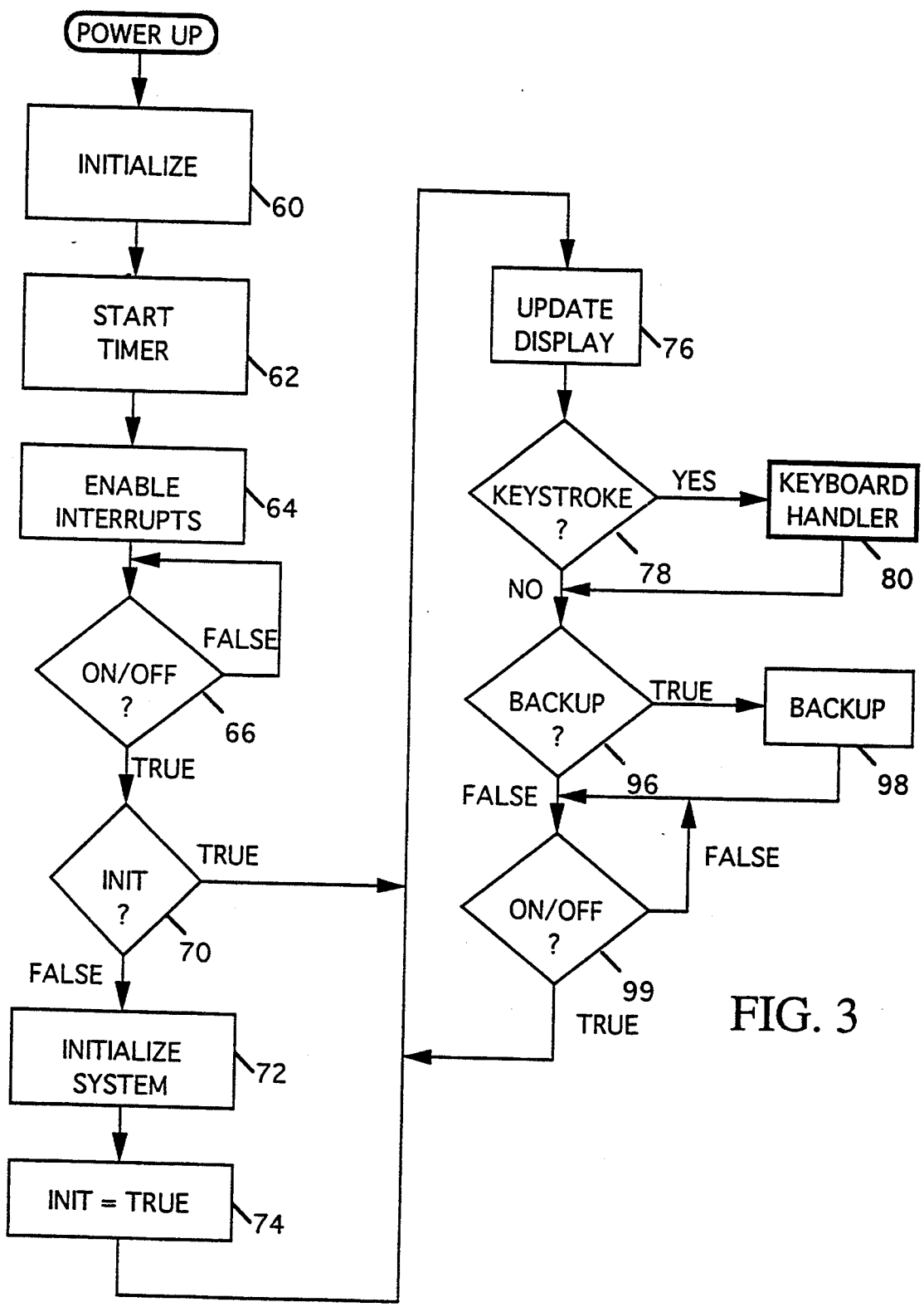
Figure 9:
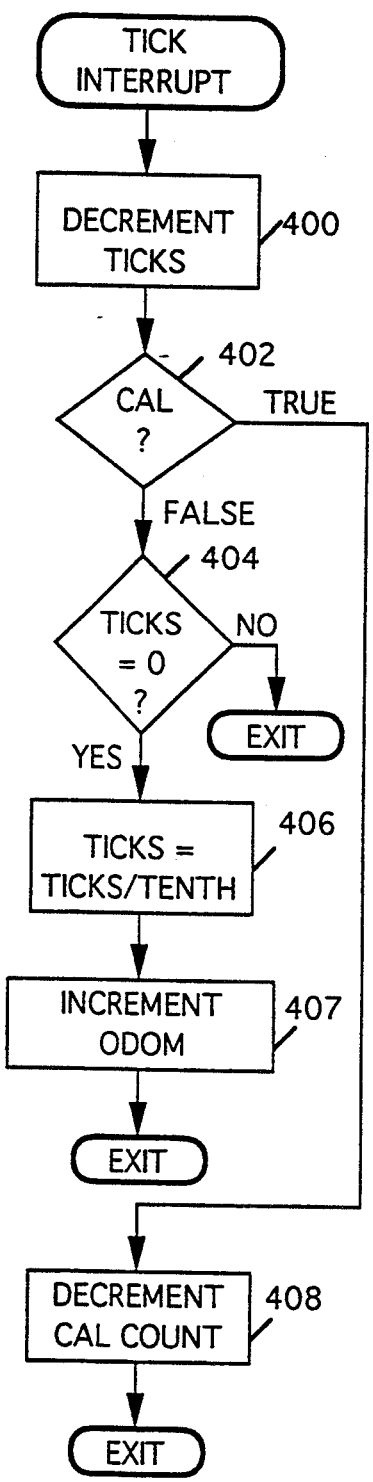
Figure 10:
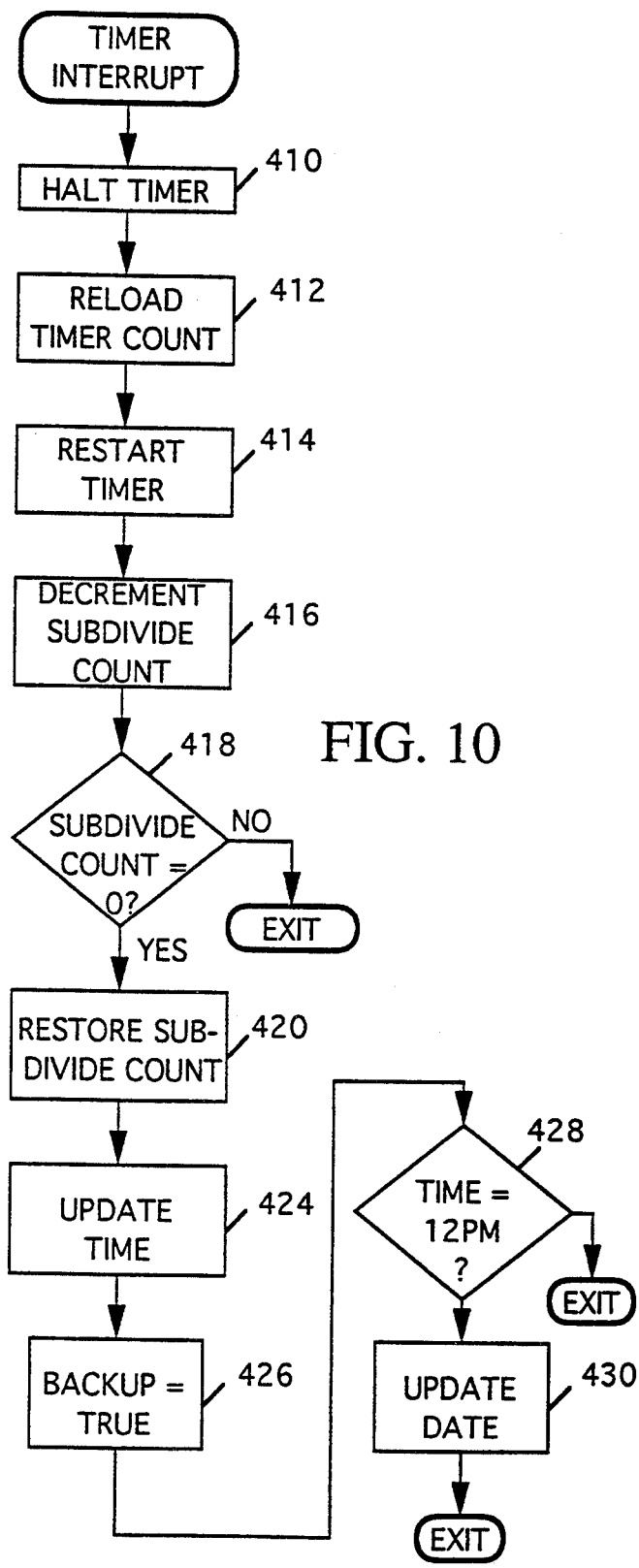

FIGS. 3–10 are flow charts illustrating software executed by microcomputer 40 of FIG. 2. FIG. 3 illustrates a main line routine, FIGS. 4–8 illustrate subroutines called in the course of executing the main line routine, and FIGS. 9–10 illustrate two interrupt handling routines.

Referring to FIG. 3, the computer processor begins executing the mainline routine on system power up. The power supply to microcomputer 40 is unswitched so that the microcomputer operates continuously regardless of whether the vehicle ignition is on or off, except when the vehicle battery is disconnected or discharged. When power is first applied to the microcomputer, either upon initial installation of the distance recorder in the vehicle or upon restoration of interrupted supply, the mainline routine initializes various operating parameters to values stored in EEPROM 46 (step 60). The routine also starts its "internal clock" by setting an eight bit TIMER parameter to a 00000000 value. The microcomputer 40 of FIG. 2 includes a timer circuit that periodically generates an internal interrupt. On each interrupt, a clock interrupt routine decrements the TIMER parameter. Whenever the timer parameter falls to 000000, the microcomputer increments a stored TIME parameter. The TIME parameter indicates time of day. When the operator resets the recorder's "internal clock" the operator actually adjusts the value of the TIME parameter.

After initializing the TIMER parameter, the main line routine enables necessary interrupts (step 64) and then periodically checks (step 66) the state of an "ON/OFF" bit indicating the state of the ON/OFF interrupt input signal from the vehicle ignition switch (device 44 of FIG. 2). When the ON/OFF bit is true, indicating the vehicle ignition is on, the routine checks the state of an "INIT" flag (step 70). The INIT flag, a data bit stored in EEPROM 46, indicates whether the distance recorder has previously operated. If the INIT flag is false, the routine initializes vat ious operating parameters to default values and clears various data storage locations (step 72). Step 72 includes writing the default trip type codes to appropriate storage locations in EEPROM 46 of FIG. 2, clearing necessary RAM and EEPROM workspace, initializing a trip data base pointer to a default value, setting a stored parameter controlling display brightness to a default value, and setting a parameter controlling the current, display mode to a "time/date" mode. The routine then sets the INIT flag true (step 74).

After step 74, or after step 70 if the INIT flag is true at step 70, the routine sets the eight-character front panel display (step 76) in accordance with the display mode currently indicated by a stored display mode control parameter (MODE). The MODE parameter is stored in EEPROM 46 and indicates whether the display is to show the date or time indicated by stored DATE and TIME parameters, the current trip type and distance, current vehicle odometer reading indicated by an ODOM parameter, or a calibration countdown value indicated by a CAL COUNT parameter.

The routine then (step 78) checks keyboard interface 52 of FIG. 1 to determine whether the operator is pressing one of the front panel keys. If so, the routine (step 80) calls a "keystroke handler" subroutine (discussed in detail hereinbelow) to take appropriate action in response to the keystroke.

After step 80, or after step 78 if no keystroke is detected, the main line routine checks a BACKUP flag (step 96). The system clock interrupt routine periodically sets the BACKUP flag true to indicate that all operating data in volatile memory should be written to EEPROM 46 of FIG. 2. Thus, the main line routine performs the backup operation (step 98) periodically so that should power to the distance recorder be interrupted, distance recorder operation will be restored to its last state at step 60 following restoration of the power supply. The backup operation includes resetting the BACKUP flag.

After backing up the mode data, or after step 96 if the BACKUP flag is false, the main line routine checks the IGNITION KEY flag to determine if the ignition switch is still on (step 99). The main line routine continues to check the ON/OFF flag until it detects that the ignition key is on. At this point, program flow returns to step 76. Thus, the main line program continues to loop through steps 76–99 as long as power is supplied to the recorder. If the power supply is interrupted and then restored, the program re-executes steps 50–70 to restore itself to its last backed up operating state before re-entering steps the 76–99 loop.

Figure 4:
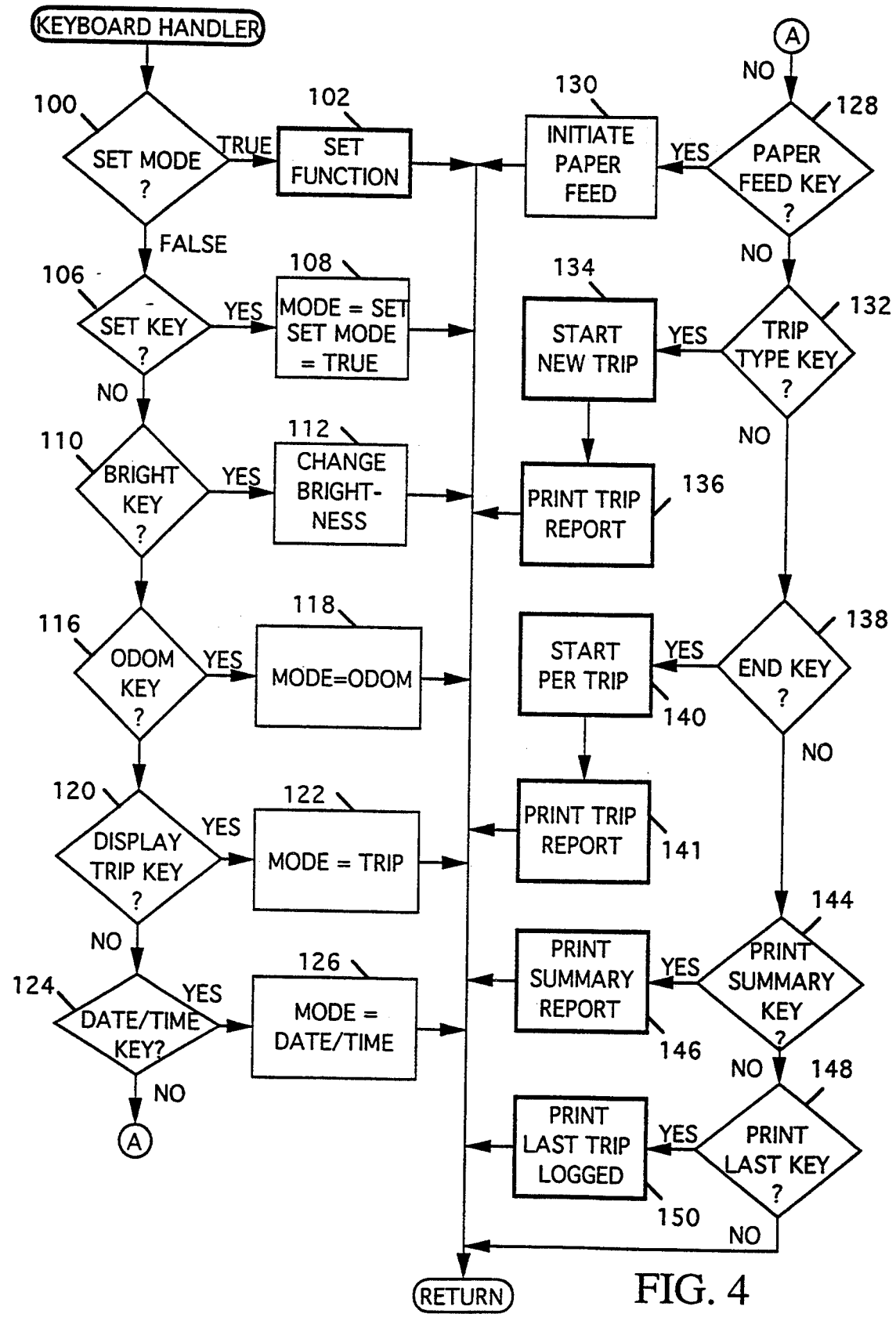

FIG. 4 illustrates the keyboard handling subroutine called at step 80 of the main line routine of FIG. 3. Referring to FIGS. 1 and 4, the subroutine initially checks a SET MODE flag at step 100. The SET MODE flag is true when the operator has last depressed the SET key 21. As discussed hereinabove, the operator may press the SET key to initiate recalibration of the ODOM and TICKS/MILE parameters, to adjust current DATE and TIME parameter values or to change a trip type code. If at step 100 the SET MODE flag is true, the keyboard handler routine calls a SET FUNCTION subroutine (step 102). The SET FUNCTION subroutine handles the recalibration or resetting operation next selected by the operator in a manner discussed hereinbelow. On return of the SET FUNCTION subroutine, the keyboard handler subroutine itself returns to the main line routine.

If the SET MODE flag is not true at step 100, the keyboard checks each of several front panel keys in succession to determine which one is depressed and upon finding a depressed key, the keyboard handler subroutine takes appropriate action.

If SET key 21 is depressed (step 106), the keyboard handler subroutine sets the SET MODE flag true (step 108), sets the display MODE parameter to indicate "SET?" should be displayed, and returns to the main line routine.

If BRIGHT key 22 is depressed (step 110), the keyboard handler subroutine decrements a display brightness control parameter (step 112) and returns.

If ODOM key 26 is depressed (step 116), the keyboard handler subroutine sets the MODE control parameter to indicate that the current ODOM parameter value should be displayed (step 118) and then returns.

If DISPLAY TRIP key 27 is depressed (step 120), the keyboard handler subroutine sets the display mode control parameter to indicate that the current trip type code and trip distance should be displayed (step 122). The subroutine then returns.

If DATE/TIME key 25 is depressed (step 124), the keyboard handler subroutine sets the display MODE parameter to indicate the current date or time that should be displayed (step 126) and then returns.

If PAPER FEED key 20 is depressed (step 128), the keyboard handler subroutine initiates a printer paper feed (step 130) and then returns.

If TRIP TYPE key 27 is depressed (step 132), the keyboard handler subroutine starts a new trip (step 134) by temporarily saving the ending trip data (as a "last trip"), prompting the operator to indicate a new trip category with one of the numbered keys 20-29 in the manner described hereinabove and initializing the current trip data accordingly. The keyboard handler routine then calls a "print trip report" subroutine (described hereinbelow) that prints the trip report for the last trip and saves the data for the completed trip in EEPROM 46 of FIG. 2 (step 136). The keyboard handler routine then returns.

If END key 23 is depressed (step 138), the keyboard handler subroutine starts a new trip (step 134) by saving the current trip data as the "last trip", automatically assigning the new trip to the PER trip type and initializing the current trip data accordingly. The keyboard handler routine then calls a "print trip report" subroutine (described hereinbelow) that prints the trip report for the last trip, and then saves data for the completed trip in EEPROM 46 of FIG. 2 (step 136). The keyboard handler routine then returns.

If PRINT SUMMARY key 29 is depressed (step 144), the keyboard handler subroutine calls a "print summary report" subroutine (described hereinbelow) that prints a summary report of trips taken between two dates (step 146). The keyboard handler subroutine then returns to the main line routine.

If PRINT LAST key 28 is depressed (step 144), the keyboard handler subroutine calls a "print last logged trip" subroutine (described hereinbelow) that prints a report of the last complete trip (step 148) based on the last stored trip data. The keyboard handler subroutine then returns to the main line routine.

Figure 5:
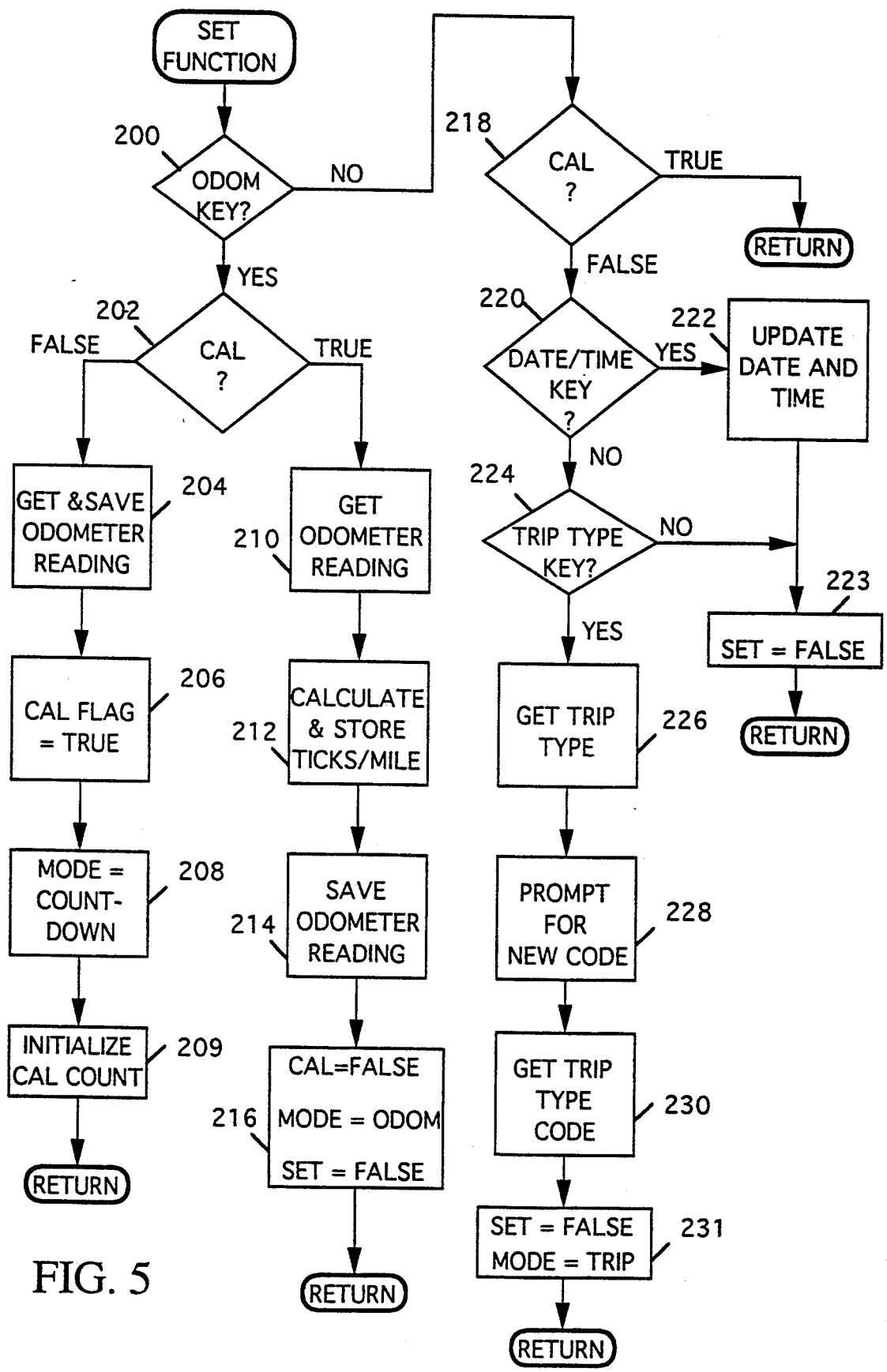

FIG. 5 illustrates the set function subroutine called at step 102 of the keyboard handler subroutine of FIG. 5 when the operator presses a key while the recorder is in the set mode. Starting at step 200, the subroutine determines whether the operator is depressing ODOM key 21. If so, the operator is commanding the distance recorder to start or stop the odometer calibration process. a CAL flag is not true (step 202), the operator has depressed the ODOM key to initiate an odometer calibration. In such case, the subroutine prompts the operator to input the current vehicle odometer reading and stores that reading in memory (step 204). The subroutine then sets the CAL flag true (step 206), sets the MODE parameter to indicate the calibration countdown display mode (step 208) and initializes the CAL COUNT parameter (step 209). The set routine returns after step 209.

If at step 202 the CAL flag is true, the operator has depressed the ODOM key to signal the end of the odometer calibration process. In such case, the subroutine prompts the operator for the current vehicle odometer reading (step 210) and then calculates and stores the TICKS/MILE parameter (step 212). The TICKS/MILE parameter is set equal to the value of a TICKS parameter indicating the number of TICK signal pulses counted during the calibration process, divided by the difference between the ending and beginning vehicle odometer readings supplied by the operator during steps 210 and 204.

After calculating and storing the TICKS/MILE parameter value at step 212, the subroutine saves the last odometer reading input at step 210 as the current value of the ODOM parameter (step 214). The subroutine also sets the CAL and SET mode flags false to terminate the odometer calibration process and sets the MODE parameter to indicate current odometer reading (step 216) before returning to the calling subroutine.

If at step 200 the operator is not pressing the ODOM key and the subroutine determines at step 218 that the CAL flag is true, the distance recorder is in the odometer calibration mode and the operator is pressing an inappropriate key. In such case, the subroutine returns to the caller without taking further action.

If the CAL flag is false at step 218, then at step 220 the subroutine determines whether the operator is pressing the DATE/TIME key. If so, the subroutine prompts the operator for the current time and date to update its stored DATE and TIME parameters (step 222), resets the SET flag (step 223) and then returns to the keyboard handler routine.

If the operator is not pressing DATE/TIME key 25 (step 220) or TRIP TYPE key 27 (step 224), the subroutine resets the SET flag (step 223) and returns to the keyboard handler routine without further action. However, if at step 224 the operator is pressing the TRIP TYPE key 27, the operator is requesting to change a trip type code. In such case, the subroutine prompts the operator to press one of the numbered keys 21-29 (step 226) to indicate which of the ten trip type codes is to be altered. The subroutine thereupon displays the code input prompt (e.g. 1???) for the selected key (step 228). The subroutine then allows the operator to alter that trip type code via keys 24 and 27 in the manner described hereinabove and saves the new trip type code in EEPROM 46 (step 230). The set function subroutine then sets the SET flag false and the MODE parameter to TRIP (step 231) and returns to the calling keyboard handler subroutine.

FIG. 6 illustrates the print trip report subroutine called at steps 136 or 141 of FIG. 4. Starting at step 300, the print trip report subroutine retrieves a pointer to a location within a trip data base area in EEPROM 46 that is to store data for the completed trip, writes the trip type code, date and distance to that storage location (step 302), and then increments and saves the pointer (step 304). If the trip type of the last completed trip is labeled PER (personal), the subroutine returns its caller without printing the trip report (step 308). However, if the last trip type code is not PER, the subroutine prints the starting date and time of the last trip (step 310), the ending date and time (step 312), the trip type (step 314) and the miles traveled (step 316). The print trip report subroutine then returns to the calling routine.

The area of EEPROM 46 of FIG. 2 reserved for the trip data base is suitably sized to store the trip type code, data and distance for the last 1000 trips taken. When that number of trips is exceeded, the recorder writes data for new trips over prior trip data.

FIG. 7 illustrates the print last trip logged subroutine called at step 150 of FIG. 4. Starting at step 320, the print last trip logged subroutine retrieves the pointer to the area in EEPROM 46 indicating the EEPROM storage location for the next completed trip. The subroutine then decrements the retrieved pointer (step 322) to determine the EEPROM storage location of the data for the last trip completed, and prints the ending date (step 324), the trip type (step 326) and miles traveled (step 328). The print last trip logged subroutine returns to the calling routine.

FIG. 8 illustrates the print summary report subroutine called at step 146 of FIG. 4. The print summary report subroutine prompts the operator for the starting date of the summary (step 340) and the ending date (Step 342). The operator enters the starting and ending date in the manner described hereinabove. The subroutine then prints the start date (step 344) and the ending date (step 346). Thereafter, the subroutine searches the trip data base stored in the EEPROM and calculates and prints the total miles driven for each trip type (step 348) between the starting and ending dates. Finally, the subroutine calculates from the trip data the total miles traveled between the starting and ending dates, and prints the result (step 350). The subroutine then returns to its caller.

FIG. 9 illustrates an interrupt routine executed on receipt of each pulse of the TICK signal input to the microcomputer 40 from the rotation sensor 42 of FIG. 2. Starting at step 400, the interrupt routine decrements a "TICKS" parameter. (The TICKS parameter is initially set equal to the value of the TICKS/TENTH parameter whenever the TICKS/TENTH parameter is recalibrated.) If the CAL flag is false (step 402), indicating that the recorder is not in the process of calibrating the TICKS/TENTH parameter, and if the TICKS count has not reached 0 (step 404), the interrupt routine exits without taking further action. However, when at step 404 the TICKS count reaches 0 the interrupt routine sets the TICKS parameter value equal to TICKS/TENTH (step 406) and sets the ODOM CHANGE flag true (step 407). Thus, the tick interrupt routine counts the number of pulses of the TICK signal and sets a flag telling the mainline routine to increment the ODOM parameter value whenever the tick count indicates the vehicle has traveled 0.1 mile.

If the recorder is currently in the calibration mode, the CAL flag is true at step 400. In such case, the tick interrupt routine decrements the CAL COUNT parameter (step 408) initialized at step 209 of FIG. 5 at the start of the calibration process. The tick interrupt routine then exits without taking further action. At this point, the recorder is currently in the calibration mode and the calibration countdown "(CAL XXX)" is currently shown on display 12 of FIG. 1, where XXX is a three-digit base ten number represented by the 8 most significant bits of the 16 bit CAL COUNT parameter. The CAL COUNT parameter is initially set to 11111010 11111111 (binary) at step 209 of the set function routine of FIG. 5. Thus, the recorder initially displays "CAL 250". But whenever the CAL COUNT parameter is decremented 256 times, the count on the display is decremented once as the main line routine of FIG. 3 updates the display at step 76 of FIG. 3. The operator is expected to terminate the calibration process before the displayed number reaches zero. Otherwise, the recorder will overrun the 16 bit TICKS count and the calibration process will fail.

FIG. 10 illustrates the timer interrupt routine executed whenever an external timer within microcomputer 40 of FIG. 2 transmits a pulse to an internal interrupt. The TIMER decrements a stored TIMER COUNT parameter value on each pulse of an oscillator output signal and interrupts the computer when the TIMER COUNT reaches zero. The interrupt routine first halts the timer (step 410), resets the TIMER COUNT parameter in the timer (step 412) and then restarts timer operation (step 414). The interrupt routine then decrements a SUBDIVIDE COUNT parameter (step 416). If the SUBDIVIDE COUNT parameter has not reached 0 (step 418), the interrupt routine terminates. However, if the SUBDIVIDE COUNT parameter has reached 0 at step 418, the interrupt routine restores the SUBDIVIDE COUNT parameter to a default value and then updates the TIME parameter stored in RAM (step 424) and sets the BACKUP flag (step 426) so that the main line routine will backup operating parameters when next reaching step 96 of FIG. 3. If the TIME parameter does not indicate 12 PM (step 428), the interrupt routine exits. Otherwise, the interrupt routine updates the date indicated by the DATE parameter (step 430) before exiting.

Thus, the vehicle distance recorder as described herein permits a user to select a user-definable trip type code at the start of each trip and displays that code and elapsed distance during the trip. The recorder thereafter stores trip information including the code, distance and date of trip in a non-volatile memory at the end of the trip and generates a printout of trip data. The recorder also may generate a summary of trip distance traveled between any two operator-selected dates for all trip types.

While the foregoing specification has described a preferred embodiment of the present invention, one skilled in the art may make many modifications to the preferred embodiment without departing from the invention in its broader aspects. The appended claims therefore cover all such modifications as fall within the true spirit and scope of the invention.

We claim:

1. An apparatus for recording distance of a trip traveled by a vehicle with a user-selected code distinguishing the trip as a particular one of a plurality of trip types, the apparatus comprising:
   a plurality of user operable keys;
   memory means for storing a trip record and for storing a plurality of codes, each of said keys being associated with a separate one of said codes;
   first means responsive to user input for altering at least one of said plurality of codes stored in said memory means in accordance with said user input; and
   second means for responding to user operation of any one of said keys by reading from said memory means a particular one of said codes associated with the operated key, determining a distance traveled by said vehicle following user operation of said one key, and writing said trip record into said memory means, said trip record comprising data referencing said one code and said distance.

2. The apparatus in accordance with claim 1 wherein said second means further comprises means for storing a date in said data base record with said trip record, the date indicating when said trip occurred.

3. The apparatus in accordance with claim 1 wherein said memory means comprises an electronically erasable programmable read only memory for storing said trip record.

4. An apparatus for recording distance of a trip traveled by a vehicle with a user-selected code distinguishing the trip as a particular one of a plurality of trip types, the apparatus comprising:
a plurality of user operable keys;
character display means for displaying a character representation of an input code;
memory means for storing a data record and for storing a plurality of codes, each of said keys being associated with a separate one of said codes;
sensor means for generating a sensor signal indicating vehicle movement;
computer means for responding to user operation of any one of said keys by reading from said memory means a particular one of said codes associated with the operated key, transmitting said particular code to said display means such that said display means displays a representation of said one code, determining from said sensor signal a distance traveled by said vehicle following user operation of said one key, and writing said data record into said memory means,
said data record comprising data referencing said one code and said distance; and
means responsive to user input for altering at least one of said plurality of codes stored in said memory means in accordance with said user input.

5. For a trip recorder for measuring distance traveled in a motor vehicle, the trip recorder being responsive to user input data and comprising a memory and a plurality of user operable keys, a method for monitoring and recording distance traveled by the vehicle comprising the steps of:
storing in said memory a plurality of codes such that each of said codes is associated with a separate one of said keys;
altering at least one of said plurality of codes stored in said memory means in accordance with user operation of one of said keys; and
responding to user operation of any one of said keys associated with any one of said codes by
reading from said memory means the one code associated with the operated one key,
measuring a distance traveled by said vehicle following user operation of said one key, and
writing a trip record into said memory means, said trip record referencing said one code and the distance measured.

6. For a trip recorder mounted in a motor vehicle and comprising means for measuring distance traveled by the motor vehicle, a memory, character display means, and a plurality of user operable keys, a method for monitoring and recording distance traveled by the vehicle comprising the steps of:
storing in said memory a plurality of codes such that each of said codes is associated with a separate one of said keys;
altering at least one of said plurality of codes stored in said memory means in response to user operation of one of said plurality of keys; and
responding to user operation of any one of said keys associated with one of said codes by
reading from said memory means the code associated with said one key,
displaying said one code on said display means,
measuring a trip distance traveled by said vehicle following user operation of said one key, and
writing into said memory means trip data referencing said one code and the measured trip distance.

7. An apparatus for recording distance of a trip traveled by a vehicle with a user-selected code distinguishing the trip as a particular one of a plurality of trip types, the apparatus comprising:
a plurality of user operable keys;
memory means for storing a plurality of codes, each of said keys being associated with a separate one of said codes; and
computer means responsive to user input for altering at least one of said plurality of codes stored in said memory means in accordance with said user input, and for responding to user operation of any one of said keys by reading from said memory means a particular one of said codes associated with the operated key, determining a distance traveled by said vehicle following user operation of said one key, and printing said particular one of said codes and data indicating said distance.

8. An apparatus for displaying distance of a trip traveled by a vehicle, the apparatus comprising:
a plurality of user operable keys;
memory means for storing a plurality of codes, each of said keys being associated with a separate one of said codes; and
means responsive to user input for altering at least one of said plurality of codes stored in said memory means in accordance with said user input, and for responding to user operation of any one key of said keys by reading from said memory means a particular one of said codes associated with said one key, determining a distance traveled by said vehicle following user operation of said one key, and displaying said particular one of said codes and data indicating said distance.

* * * * *